(12) United States Patent
Okada et al.

(10) Patent No.: US 11,072,346 B2
(45) Date of Patent: Jul. 27, 2021

(54) AUTONOMOUS DRIVING SYSTEM, NON-TRANSITORY TANGIBLE COMPUTER READABLE MEDIUM, AND AUTONOMOUS DRIVING STATE NOTIFYING METHOD

(71) Applicant: DENSO CORPORATION, Kariya (JP)

(72) Inventors: Kodai Okada, Kariya (JP); Kiyoshi Tsurumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/099,591

(22) PCT Filed: Apr. 25, 2017

(86) PCT No.: PCT/JP2017/016320
§ 371 (c)(1),
(2) Date: Nov. 7, 2018

(87) PCT Pub. No.: WO2017/199708
PCT Pub. Date: Nov. 23, 2017

(65) Prior Publication Data
US 2019/0144002 A1    May 16, 2019

(30) Foreign Application Priority Data
May 19, 2016  (JP) .............................. JP2016-100467

(51) Int. Cl.
*B60W 50/00*  (2006.01)
*B60W 50/14*  (2020.01)
(Continued)

(52) U.S. Cl.
CPC ........ *B60W 50/14* (2013.01); *B60W 50/0098* (2013.01); *G01C 21/3697* (2013.01);
(Continued)

(58) Field of Classification Search
CPC ............ B60W 50/14; B60W 50/0098; B60W 2050/146; G05D 1/0088; G05D 2201/0213
See application file for complete search history.

(56) References Cited

U.S. PATENT DOCUMENTS

| 5,612,883 | A | * | 3/1997 | Shaffer | .............. | B60K 31/0008 340/435 |
| 5,931,888 | A | * | 8/1999 | Hiyokawa | .............. | G01C 21/34 701/411 |

(Continued)

FOREIGN PATENT DOCUMENTS

| JP | 2003166838 A | * | 11/2001 | ............. G01C 21/00 |
| JP | 2003-166838 A |  | 6/2003 |  |

(Continued)

*Primary Examiner* — Hai Phan
*Assistant Examiner* — Son M Tang
(74) *Attorney, Agent, or Firm* — Maschoff Brennan

(57) ABSTRACT

An autonomous driving system includes: a traveling plan creation section that creates a traveling plan of an autonomous driving operation; a traveling state acquisition section that acquires an actual traveling state in the autonomous driving operation; a determination section that verifies the actual traveling state in the autonomous driving operation with the traveling plan of the autonomous driving operation, and determines whether the autonomous driving operation is performed according to the traveling plan; and a notification control section that notifies a determination result of the determination section. The autonomous driving system gives the driver a sense of security.

16 Claims, 13 Drawing Sheets

(51) Int. Cl.
*G01C 21/36* (2006.01)
*G05D 1/00* (2006.01)

(52) U.S. Cl.
CPC ..... *G05D 1/0088* (2013.01); *B60W 2050/146* (2013.01); *G05D 2201/0213* (2013.01)

(56) References Cited

U.S. PATENT DOCUMENTS

| | | | | |
|---|---|---|---|---|
| 7,609,150 | B2 * | 10/2009 | Wheatley | B60Q 9/008 340/436 |
| 7,649,444 | B1 * | 1/2010 | Fear | B60Q 5/00 340/384.1 |
| 8,346,426 | B1 * | 1/2013 | Szybalski | B60W 50/14 701/28 |
| 8,649,930 | B2 * | 2/2014 | Reeve | A01B 69/008 701/23 |
| 8,924,150 | B2 * | 12/2014 | Tsimhoni | G01C 21/365 701/454 |
| 8,941,500 | B1 * | 1/2015 | Faaborg | H04W 68/00 340/573.1 |
| 2004/0236504 | A1 * | 11/2004 | Bickford | G01C 21/3679 701/408 |
| 2006/0247832 | A1 * | 11/2006 | Taki | G07C 5/008 701/31.4 |
| 2007/0027572 | A1 * | 2/2007 | Koyama | G01S 19/49 700/211 |
| 2007/0155404 | A1 * | 7/2007 | Yamane | G01C 21/3694 455/456.1 |
| 2007/0179709 | A1 * | 8/2007 | Doyle | G01C 21/3453 701/417 |
| 2008/0042813 | A1 * | 2/2008 | Wheatley | B60Q 9/008 340/435 |
| 2008/0077322 | A1 * | 3/2008 | Sumizawa | G01C 21/30 701/448 |
| 2008/0208453 | A1 * | 8/2008 | Fujimoto | G01C 21/3446 701/533 |
| 2009/0143974 | A1 * | 6/2009 | Adachi | G01C 21/34 701/532 |
| 2010/0057358 | A1 * | 3/2010 | Winer | G01C 21/3407 701/414 |
| 2010/0121526 | A1 * | 5/2010 | Pham | B60W 30/146 701/36 |
| 2011/0224898 | A1 * | 9/2011 | Scofield | G01C 21/3492 701/532 |
| 2012/0173069 | A1 * | 7/2012 | Tsimhoni | G01C 21/365 701/25 |
| 2012/0188098 | A1 * | 7/2012 | Mochizuki | G08G 1/096783 340/905 |
| 2012/0239224 | A1 * | 9/2012 | McCabe | B66F 9/063 701/2 |
| 2013/0007665 | A1 * | 1/2013 | Chaudhri | G06F 3/04842 715/830 |
| 2013/0265178 | A1 * | 10/2013 | Tengler | G08G 1/091 340/989 |
| 2013/0304279 | A1 * | 11/2013 | Mudalige | G08G 1/164 701/2 |
| 2014/0292554 | A1 * | 10/2014 | Smith | B60K 31/0008 342/27 |
| 2016/0223343 | A1 * | 8/2016 | Averbuch | G01C 21/26 |
| 2016/0361030 | A1 * | 12/2016 | Buresh, II | G16H 40/67 |
| 2017/0010613 | A1 | 1/2017 | Fukumoto | |
| 2017/0113686 | A1 * | 4/2017 | Horita | B60W 30/09 |
| 2018/0077097 | A1 * | 3/2018 | Alfaro | H04L 67/306 |
| 2020/0142746 | A1 * | 5/2020 | Gong | G06F 9/4881 |

FOREIGN PATENT DOCUMENTS

| | | |
|---|---|---|
| JP | 2015-158467 A | 9/2015 |
| JP | 2015-161565 A | 9/2015 |

\* cited by examiner

AUTONOMOUS DRIVING SYSTEM, NON-TRANSITORY TANGIBLE COMPUTER READABLE MEDIUM, AND AUTONOMOUS DRIVING STATE NOTIFYING METHOD

CROSS REFERENCE TO RELATED APPLICATION

This application is based on Japanese Patent Application No. 2016-100467 filed on May 19, 2016, the disclosure of which is incorporated herein by reference.

TECHNICAL FIELD

The present disclosure relates to an autonomous driving system, an autonomous driving state notifying program, and an autonomous driving state notifying method.

BACKGROUND ART

An autonomous driving system which performs autonomous driving of a vehicle has conventionally been put to practical use. A driving operation by a driver is unnecessary during a period in which the autonomous driving system performs autonomous driving. Thus, for example, Patent Literature 1 discloses a technique that notifies only information that is not used in a determination of a driving operation to the driver without notifying information that is used in a determination of a driving operation among pieces of information generated by a navigation device during a period in which an autonomous driving system performs autonomous driving. The information that is used in a determination of a driving operation is, for example, information such as "turn right at a branch ahead" or "there is a merging point soon, please drive carefully". The information that is not used in a determination of a driving operation is, for example, information such as "entered XX prefecture" or "the fee is XX yen".

PRIOR ART LITERATURES

Patent Literature

Patent Literature 1: JP-2015-161565-A

SUMMARY

The autonomous driving system creates a traveling plan and performs autonomous driving according to the created traveling plan. Thus, a driver has a request that the driver grasp whether the autonomous driving system is performing autonomous driving according to the traveling plan to feel secure. However, the technique of Patent Literature 1 merely notifies only information that is not used in a determination of a driving operation and cannot respond to the driver's request that the driver feel secure.

It is an object of the present disclosure to provide an autonomous driving system, an autonomous driving state notifying program, and an autonomous driving state notifying method that are capable of notifying whether autonomous driving is being performed according to a traveling plan to the driver to give the driver a sense of security.

According to a first aspect of the present disclosure, an autonomous driving system includes: a traveling plan creation section that creates a traveling plan of an autonomous driving operation; a traveling state acquisition section that acquires an actual traveling state in the autonomous driving operation; a determination section that verifies the actual traveling state in the autonomous driving operation with the traveling plan of the autonomous driving operation, and determines whether the autonomous driving operation is performed according to the traveling plan; and a notification control section that notifies a determination result of the determination section.

In the above autonomous driving system, it is possible to report whether the autonomous driving system is performing autonomous driving according to the traveling plan to the driver to give the driver a sense of security by reporting a determination result obtained by determining whether autonomous driving is being performed according to the traveling plan.

According to a second aspect of the present disclosure, an autonomous driving state notifying program controls a control unit in an autonomous driving system to execute: a traveling plan creation step of creating a traveling plan of an autonomous driving operation; a traveling state acquisition step of acquiring an actual traveling state in the autonomous driving operation; a determination step of verifying the actual traveling state in the autonomous driving operation with the traveling plan of the autonomous driving operation, and determining whether the autonomous driving operation is performed according to the traveling plan; and a notification control step of notifying a determination result of the determination step.

In the above autonomous driving state reporting program, it is possible to report whether the autonomous driving system is performing autonomous driving according to the traveling plan to the driver to give the driver a sense of security by reporting a determination result obtained by determining whether autonomous driving is being performed according to the traveling plan.

According to a third aspect of the present disclosure, an autonomous driving state notifying method includes: creating a traveling plan of an autonomous driving operation; acquiring an actual traveling state in the autonomous driving operation; verifying the actual traveling state in the autonomous driving operation with the traveling plan of the autonomous driving operation, and determining whether the autonomous driving operation is performed according to the traveling plan; and notifying a determination result of the determining.

In the above autonomous driving state reporting method, it is possible to report whether the autonomous driving system is performing autonomous driving according to the traveling plan to the driver to give the driver a sense of security by reporting a determination result obtained by determining whether autonomous driving is being performed according to the traveling plan.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
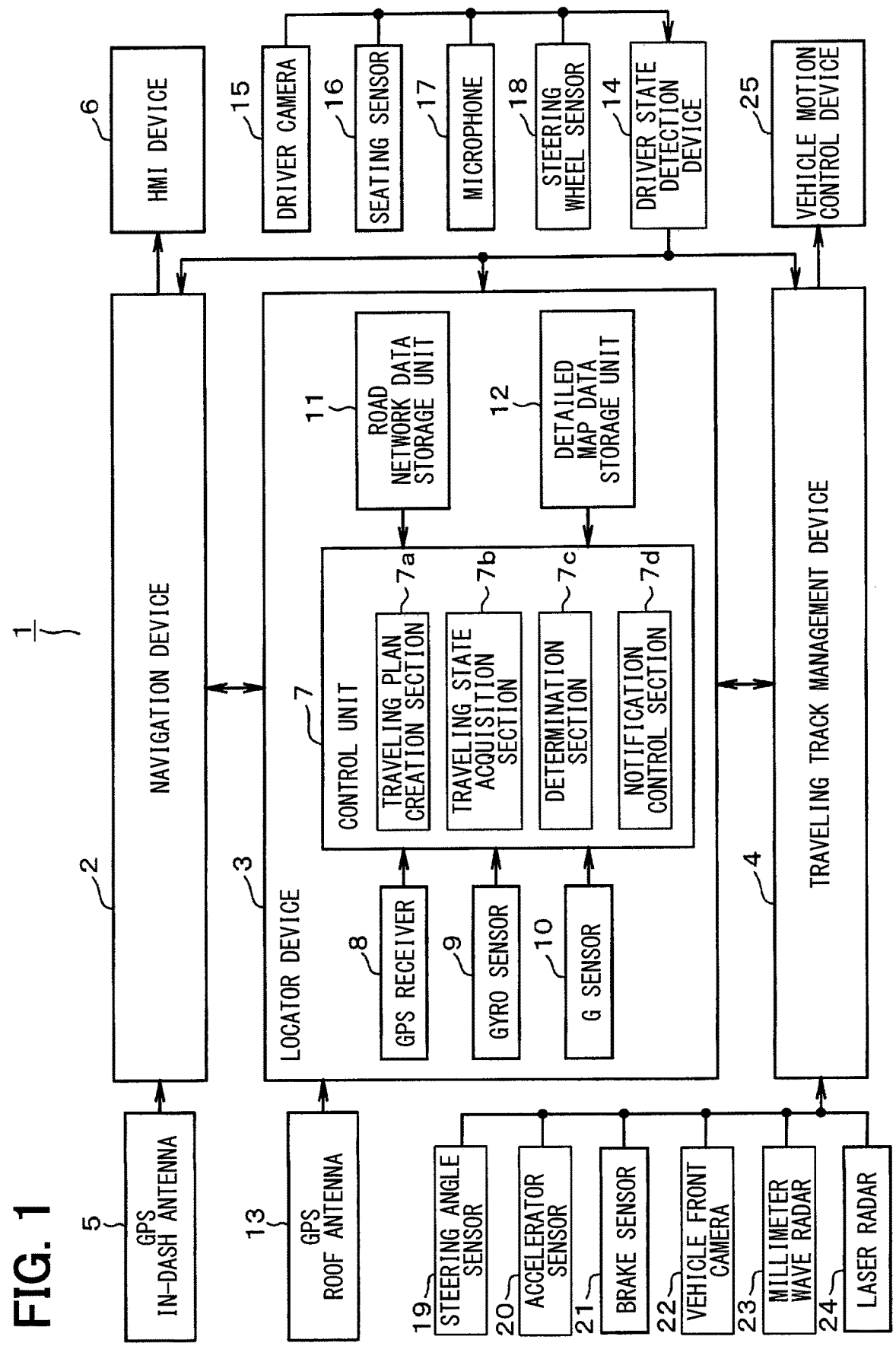
FIG. 1 is a functional block diagram illustrating an embodiment of the present disclosure.
Figure 2:
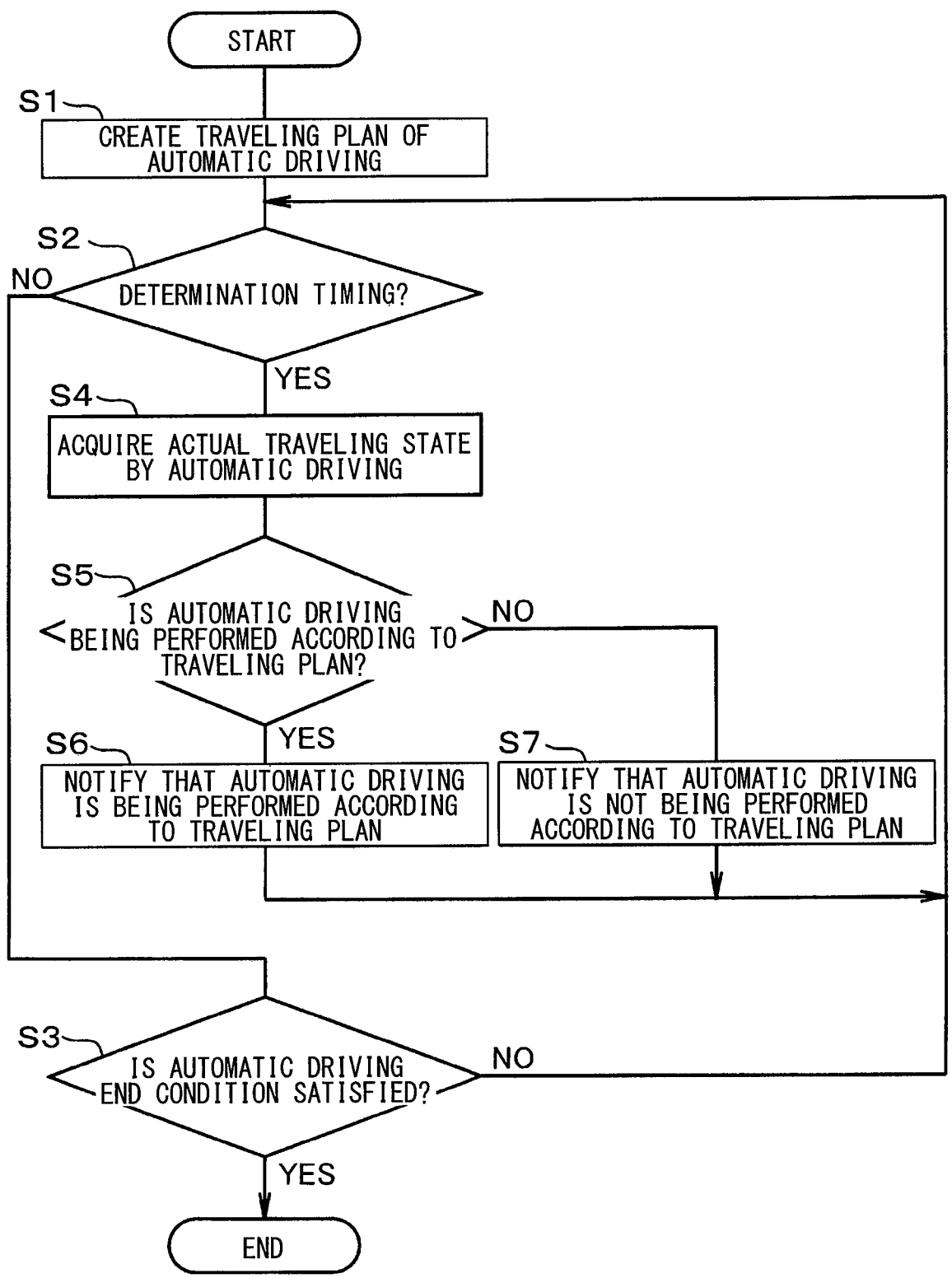
FIG. 2 is a flowchart illustrating an autonomous driving state notifying process.

Hereinbelow, an embodiment of the present disclosure will be described with reference to the drawings. An autonomous driving system 1 includes a navigation device 2, a locator device 3, and a traveling track management device 4.

The navigation device 2 has a function of receiving GPS radio waves that are radiated from a GPS satellite and captured by a GPS in-dash antenna 5 and calculating various parameters extracted from the GPS radio waves to identify the current position of an own vehicle as an own vehicle position. The navigation device 2 outputs various pieces of navigation information such as the own vehicle position, a destination, a route from the own vehicle position to the destination, and an estimated time of arrival to the locator device 3. The navigation device 2 outputs a display command signal and a voice output command signal to an HMI device 6.

The HMI device 6 is a head-up display or a speaker. When a display command signal is input to the HMI device 6 from the navigation device 2, the HMI device 6 displays display information such as a warning or a route guide on the head-up display in accordance with the display command signal. When a voice output command signal is input to the HMI device 6 from the navigation device 2, the HMI device 6 voice-outputs voice information such as a warning or a route guide from the speaker in accordance with the voice output command signal.

The locator device 3 includes a control unit 7, a GPS receiver 8, a gyro sensor 9, a G sensor 10, a road network data storage unit 11, and a detailed map data storage unit 12. The GPS receiver 8 receives GPS radio waves that are radiated from the GPS satellite and captured by a GPS roof antenna 13, calculates various parameters extracted from the GPS radio waves to identify the current position of the own vehicle as the own vehicle position, and outputs a position signal which indicates the identified own vehicle position to the control unit 7. The gyro sensor 9 detects an angular velocity acting on the own vehicle and outputs an angular velocity signal which indicates the detected angular velocity to the control unit 7. The G sensor 10 detects an acceleration acting on the own vehicle and outputs an acceleration signal which indicates the detected acceleration to the control unit 7. The road network data storage unit 11 stores road network data therein and outputs the road network data to the control unit 7. The detailed map data storage unit 12 stores detailed map data therein and outputs the detailed map data to the control unit 7. The road network data stored in the road network data storage unit 11 and the detailed map data stored in the detailed map data storage unit 12 have a higher accuracy than map data that is used by the navigation device 2 to identify the own vehicle position.

The control unit 7 corrects the own vehicle position indicated by the position signal input from the GPS receiver 8 using the angular velocity indicated by the angular velocity signal input from the gyro sensor 9 and the acceleration indicated by the acceleration signal input from the G sensor 10. The control unit 7 is capable of identifying the own vehicle position with a higher accuracy than the navigation device 2 by using the road network data and the detailed map data which have a relatively high accuracy as described above, and corrects the own vehicle position identified by the navigation device 2.

A driver camera 15 captures an image of a driver who is seated on a driver's seat and outputs an image signal including the captured image to a driver state detection device 14. The driver camera 15 is, for example, a charge coupled device (CCD) image sensor or a complementary metal oxide semiconductor (CMOS) image sensor. One driver camera 15 or a plurality of driver cameras 15 may be provided. A seating sensor 16 outputs a seating sensor signal which indicates a pressure acting on the driver's seat to the driver state detection device 14. A microphone 17 outputs a collected voice signal which indicates a collected voice to the driver state detection device 14. A steering wheel sensor 18 outputs a steering wheel sensor signal which indicates a pressure acting on a steering wheel to the driver state detection device 14.

The driver state detection device 14 detects the state of the driver using the image signal input from the driver camera 15, the seating sensor signal input from the seating sensor 16, the collected voice signal input from the microphone 17, and the steering wheel sensor signal input from the steering wheel sensor 18. Specifically, specifically, the driver state detection device 14, for example, determines an image including the driver seated on the driver's seat and a certain value or more of pressure acting on the driver's seat using the image signal and the seating sensor signal to determine that the driver is seated on the driver's seat. The driver state detection device 14, for example, determines an image including the driver with his/her eyes open and a voice given by the driver using the image signal and the collected voice signal to determine that the driver is awake. The driver state detection device 14, for example, determines that the driver gives a voice for agreement to switching from autonomous driving to manual driving using the collected voice signal to determine that the driver agrees to the switching from autonomous driving to manual driving. The driver state detection device 14, for example, determines a certain value or more of pressure acting on the steering wheel using the steering wheel sensor signal to determine that the driver holds the steering wheel. When the driver state detection device 14 determines whether the driver is seated on the driver's seat, whether the driver is awake, whether the driver agrees to the switching from autonomous driving to manual driving, and whether the driver holds the steering wheel, the driver state detection device 14 outputs detection signals which indicate determination results thereof to the navigation device 2, the locator device 3, and the traveling track management device 4.

A steering angle sensor 19 detects a steering angle of the steering wheel and outputs a steering angle signal which indicates the detected steering angle of the steering wheel to the traveling track management device 4. An accelerator sensor 20 detects an operation amount of an accelerator and outputs an accelerator signal which indicates the detected operation amount of the accelerator to the traveling track management device 4. A brake sensor 21 detects an operation amount of a brake and outputs a brake signal which indicates the detected operation amount of the brake to the traveling track management device 4.

A vehicle front camera 22 captures an image of an area ahead of the own vehicle and outputs an image signal including the captured image to the traveling track management device 4. The vehicle front camera is, for example, a CCD image sensor or a CMOS image sensor. One vehicle front camera 22 or a plurality of vehicle front cameras 22 may be provided. A millimeter wave radar 23 transmits a millimeter wave to an area ahead of the own vehicle, detects the presence of an object (e.g., a preceding vehicle) ahead of the own vehicle from a reception state of a reflected wave, and outputs a detection signal which indicates a detection result thereof to the traveling track management device 4. A laser radar 24 transmits laser light to an area ahead of the own vehicle, detects the presence of an object ahead of the own vehicle from a reception state of a reflected wave, and outputs a detection signal which indicates a detection result thereof to the traveling track management device 4. One millimeter wave radar or a plurality of millimeter wave radars may be provided. One laser radar or a plurality of laser radars may be provided.

The traveling track management device 4 identifies a traveling track of the own vehicle using the steering angle signal input from the steering angle sensor 19, the accelerator signal input from the accelerator sensor 20, the brake signal input from the brake sensor 21, the image signal input from the vehicle front camera 22, the detection signal input from the millimeter wave radar 23, and the detection signal input from the laser radar 24. When an autonomous driving switching signal is input to the traveling track management device 4 from the locator device 3, the traveling track management device 4 outputs traveling track information which indicates the identified traveling track to a vehicle motion control device 25 to switch the system from manual driving to autonomous driving. When a manual driving switching signal is input to the traveling track management device 4 from the locator device 3, the traveling track management device 4 switches the system from autonomous driving to manual driving. When an automatic stop signal is input to the traveling track management device 4 from the locator device 3, the traveling track management device 4 outputs automatic stop information to the vehicle motion control device 25 to automatically stop the own vehicle at a safety island.

When the traveling track information is input to the vehicle motion control device 25 from the traveling track management device 4, the vehicle motion control device 25 controls the motion of the own vehicle so that the own vehicle travels following the traveling track indicated by the traveling track information. When the automatic stop information is input to the vehicle motion control device 25 from the traveling track management device 4, the vehicle motion control device 25 controls the motion of the own vehicle so that the own vehicle automatically stops at a safety island.

In the locator device 3, the control unit 7 includes a microcomputer that includes a central processing unit (CPU), a read only memory (ROM), a random access memory (RAM), and an input/output (I/O). The control unit 7 executes a computer program stored in a nontransitive and substantive storage medium to execute a process corresponding to the computer program to control the entire operation of the locator device 3.

The control unit 7 includes a traveling plan creation section 7a, a traveling state acquisition section 7b, a determination section 7c, and a notification control section 7d as functions related to the present disclosure. Each of the sections 7a to 7d is composed of an autonomous driving state notifying program executed by the control unit 7 and implemented by software.

The traveling plan creation section 7a creates, for example, a correspondence relationship between a predetermined time based on a predetermine time instant and a predetermined point in a route from the own vehicle position to the destination as a traveling plan of autonomous driving using navigation information input from the navigation device 2. The traveling plan creation section 7a may create a traveling plan using various pieces of traffic information such as traffic jam information, speed regulation information, and lane regulation information by a vehicle information and communication system (VICS, registered trademark) and successively update the traveling plan in response to later changes in the traffic situation. For example, when the traveling plan creation section 7a calculates "12:00" as an estimate time of arrival at a predetermined point as the predetermined time instant, the traveling plan creation section 7a calculates "11:50 to 12:10" including 10 minutes before and after "12:00" as a base as the predetermined time and creates the correspondence relationship between the predetermined time and the predetermined point. The time before and after the predetermined time instant as a base serves as a criterion for determining whether autonomous driving is being performed according to the traveling plan, and may have a fixed value or a variable value that is settable by the driver in any manner.

The traveling state acquisition section 7b acquires an own vehicle position (that is, a traveling position) as an actual traveling state by autonomous driving. The determination section 7c checks the actual traveling state by autonomous driving against the traveling plan of autonomous driving to determine whether autonomous driving is being performed according to the traveling plan. That is, the determination section 7c determines that autonomous driving is being performed according to the traveling plan when the determination section 7c determines that the own vehicle passes through or has passed through the predetermined point within the predetermined time indicated by the traveling plan of autonomous driving. For example, when "11:50 to 12:10" is calculated as the predetermined time as describe above, the determination section 7c determines that autonomous driving is being performed according to the traveling plan when the determination section 7c determines that the own vehicle passes through or has passed through the predetermined point within the period of "11:50 to 12:10" (e.g., at "11:53").

On the other hand, the control unit 7 determines that autonomous driving is not being performed according to the traveling plan when the control unit 7 determines that the own vehicle does not pass through or has not passed through the predetermined point within the predetermined time indicated by the traveling plan of autonomous driving. For example, when "11:50 to 12:10" is calculated as the predetermined time as describe above, the determination section 7c determines that autonomous driving is being performed ahead of the traveling plan when the determination section 7c determines that the own vehicle passes through or has passed through the predetermined point before the period of "11:50 to 12:10" (e.g., at "11:45") and determines that autonomous driving is being performed behind the traveling plan when the determination section 7c determines that the own vehicle passes through or has passed through the predetermined point after the period of "11:50 to 12:10" (e.g., at "12:26").

The notification control section 7d outputs a notification command signal to the HMI device 6 through the navigation device 2 so that the HMI device 6 notifies notification information which indicates a determination result whether autonomous driving is being performed according to the traveling plan.

Next, the action of the configuration described above will be described with reference to FIGS. 2 to 13. The control unit 7 performs an autonomous driving state notifying process in relation to the present disclosure. When switching from manual driving to autonomous driving is performed, the control unit 7 starts the autonomous driving state notifying process. Here, a case where autonomous driving is performed in an autonomous driving section which is a section between interchanges of an expressway will be described.

When the control unit 7 starts the autonomous driving state notifying process, the control unit 7 creates a traveling plan of autonomous driving (S1, corresponding to a traveling plan creation step). The control unit 7 determines whether determination timing which is previously set has come (S2) and determines whether an autonomous driving end condition is satisfied (S3). The determination timing includes timing when the own vehicle passes through or has passed through a predetermined point, timing when an elapsed time from the start of autonomous driving by the autonomous driving system 1 reaches a predetermined time, and timing when a travel distance of the own vehicle from the start of autonomous driving by the autonomous driving system 1 reaches a predetermined distance. When the control unit 7 determines that the determination timing has come (S2: YES), the control unit 7 acquires an actual traveling state by autonomous driving (S4, corresponding to a traveling state acquisition step). Then, the control unit 7 checks the actual traveling state by autonomous driving against the traveling plan of autonomous driving to determine whether autonomous driving is being performed according to the traveling plan (S5, corresponding to a determination step).

Figure 3:
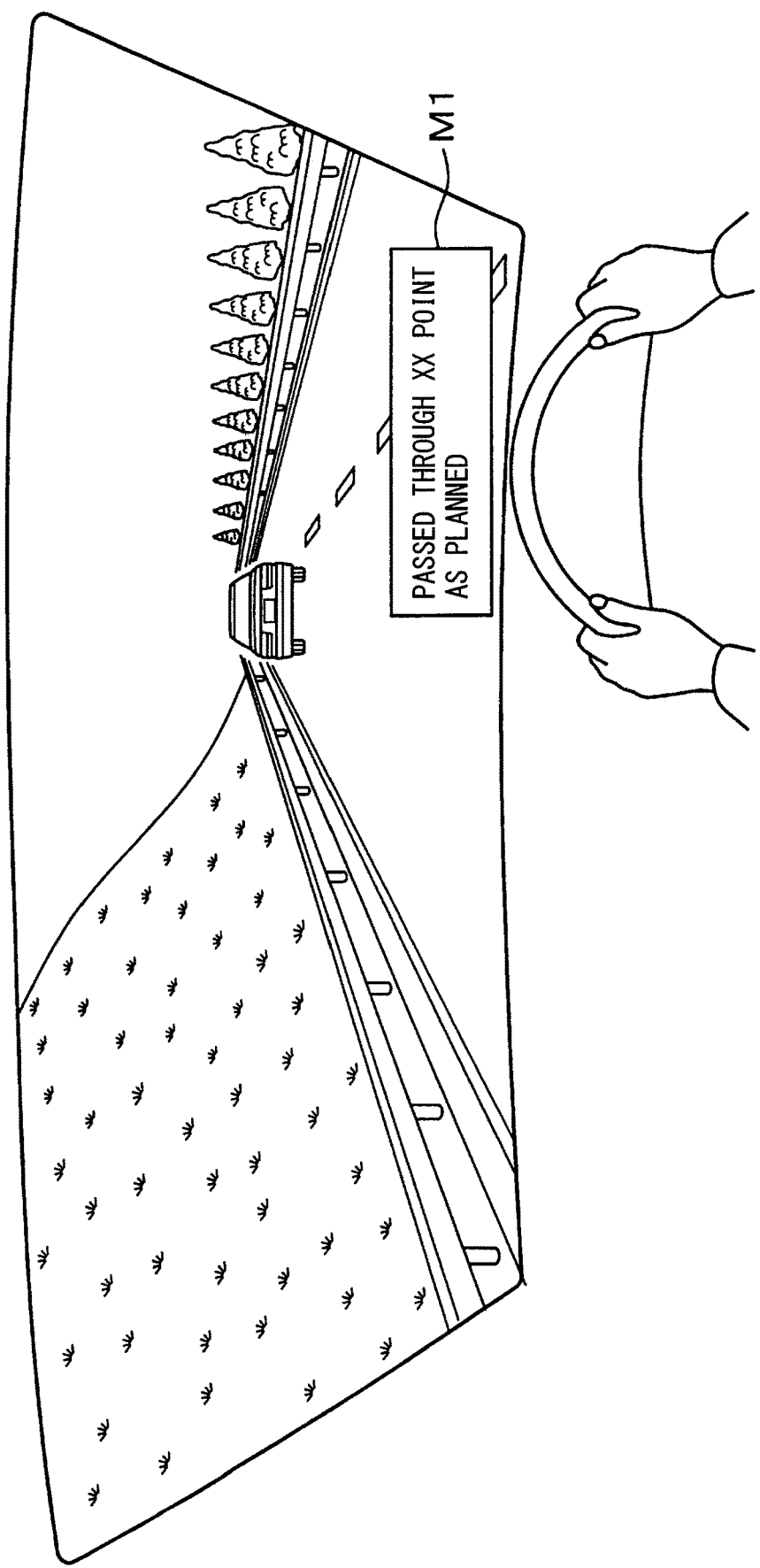
FIG. 3 is a diagram (No. 1) illustrating a notifying mode.

When the control unit 7 determines that the own vehicle passes through or has passed through the predetermined point within the predetermined time and thereby determines that autonomous driving is being performed according to the traveling plan (S5: YES), the control unit 7 outputs a notification command signal to the HMI device 6 through the navigation device 2 to notify that autonomous driving is being performed according to the traveling plan by the HMI device 6 (S6, corresponding to a notification control step). That is, the control unit 7 outputs, for example, a display command signal to the HMI device 6 through the navigation device 2 to display display information M1 such as "passed through XX point as planned" on the head-up display as illustrated in FIG. 3. The control unit 7 may output a voice output command signal to the HMI device 6 through the navigation device 2 to voice-output voice information indicating that autonomous driving is being performed according to the traveling plan from the speaker.

On the other hand, when the control unit 7 determines that the own vehicle does not pass through or has not passed through the predetermined point within the predetermined time and thereby determines that autonomous driving is not being performed according to the traveling plan (S5: NO), the control unit 7 outputs a notification command signal to the HMI device 6 through the navigation device 2 to notify that autonomous driving is not being performed according to the traveling plan by the HMI device 6 (S7, corresponding to the notification control step).

Figure 4:
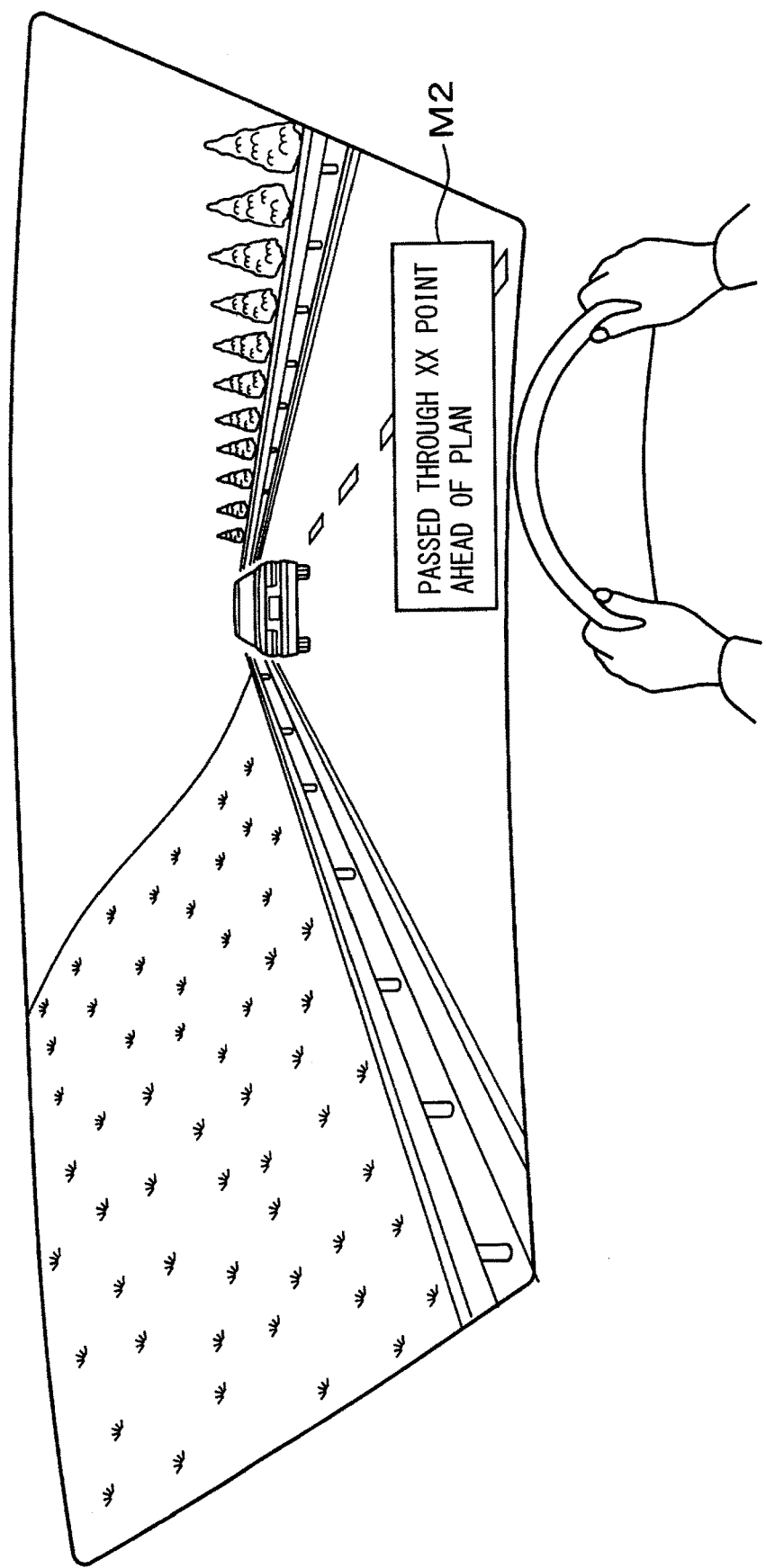
FIG. 4 is a diagram (No. 2) illustrating a notifying mode.
Figure 5:
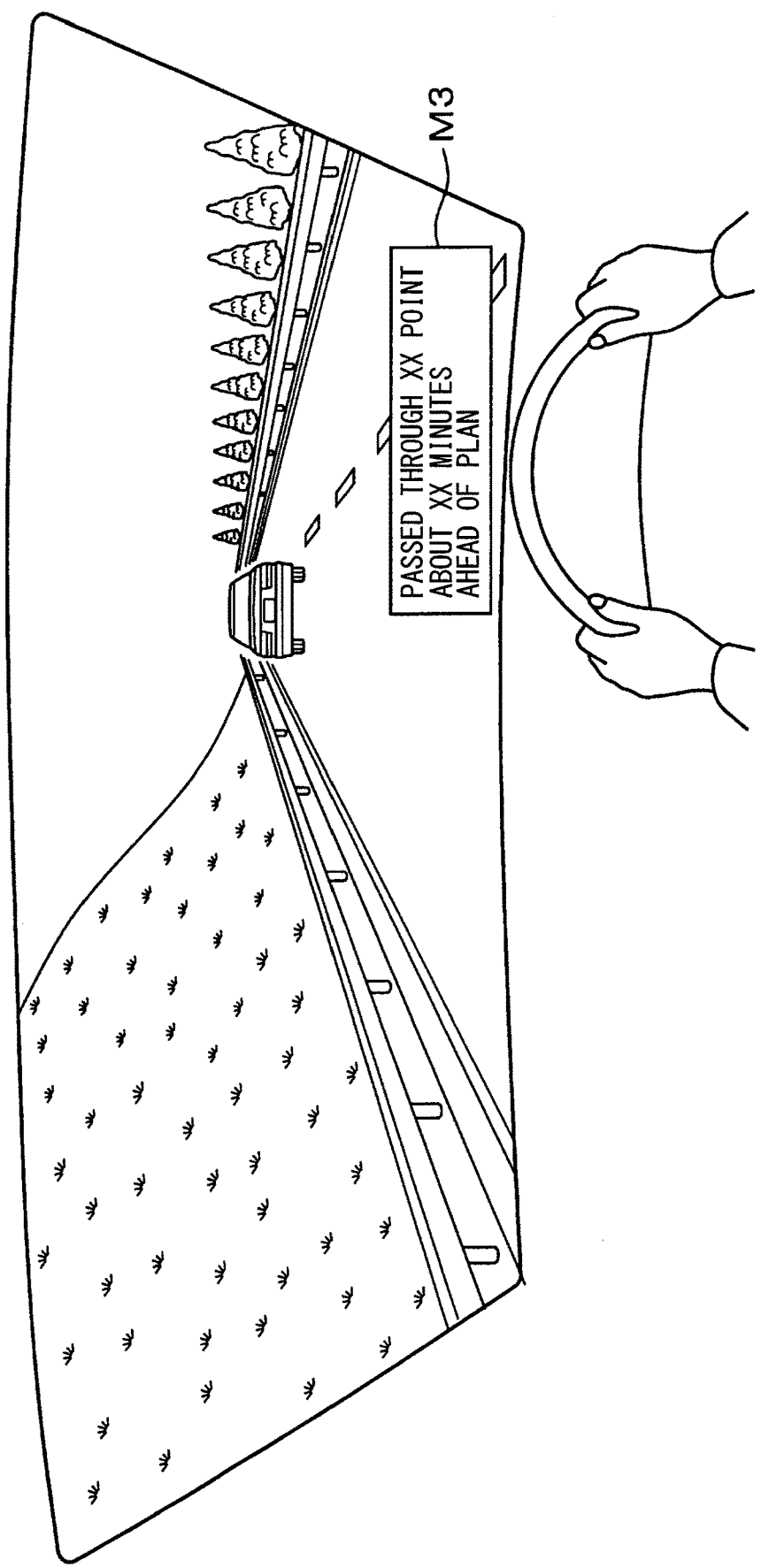
FIG. 5 is a diagram (No. 3) illustrating a notifying mode.

That is, when the control unit 7 determines that the own vehicle passes through or has passed through the predetermined point before the predetermined time and thereby determines that autonomous driving is being performed ahead of the traveling plan, the control unit 7 displays, for example, display information M2 such as "passed through XX point ahead of plan" on the head-up display as illustrated in FIG. 4. The control unit 7 may calculate an advanced time with respect to the traveling plan to display, for example, display information M3 such as "passed through XX point about XX minutes ahead of plan" on the head-up display as illustrated in FIG. 5. Also in this case, the control unit 7 may output a voice output command signal to the HMI device 6 through the navigation device 2 to voice-output voice information indicating that autonomous driving is being performed ahead of the traveling plan from the speaker.

Figure 6:
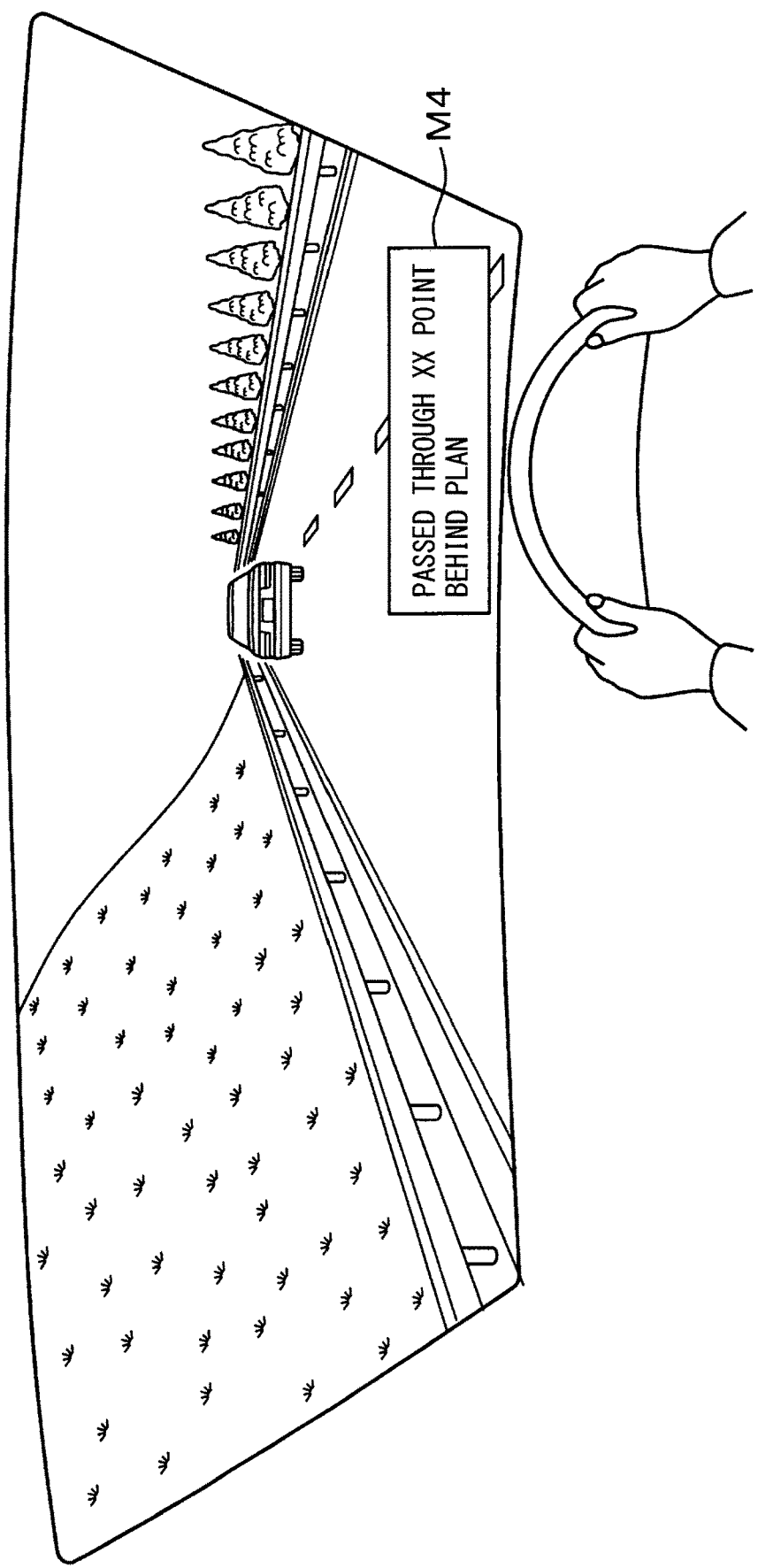
FIG. 6 is a diagram (No. 4) illustrating a notifying mode.
Figure 7:
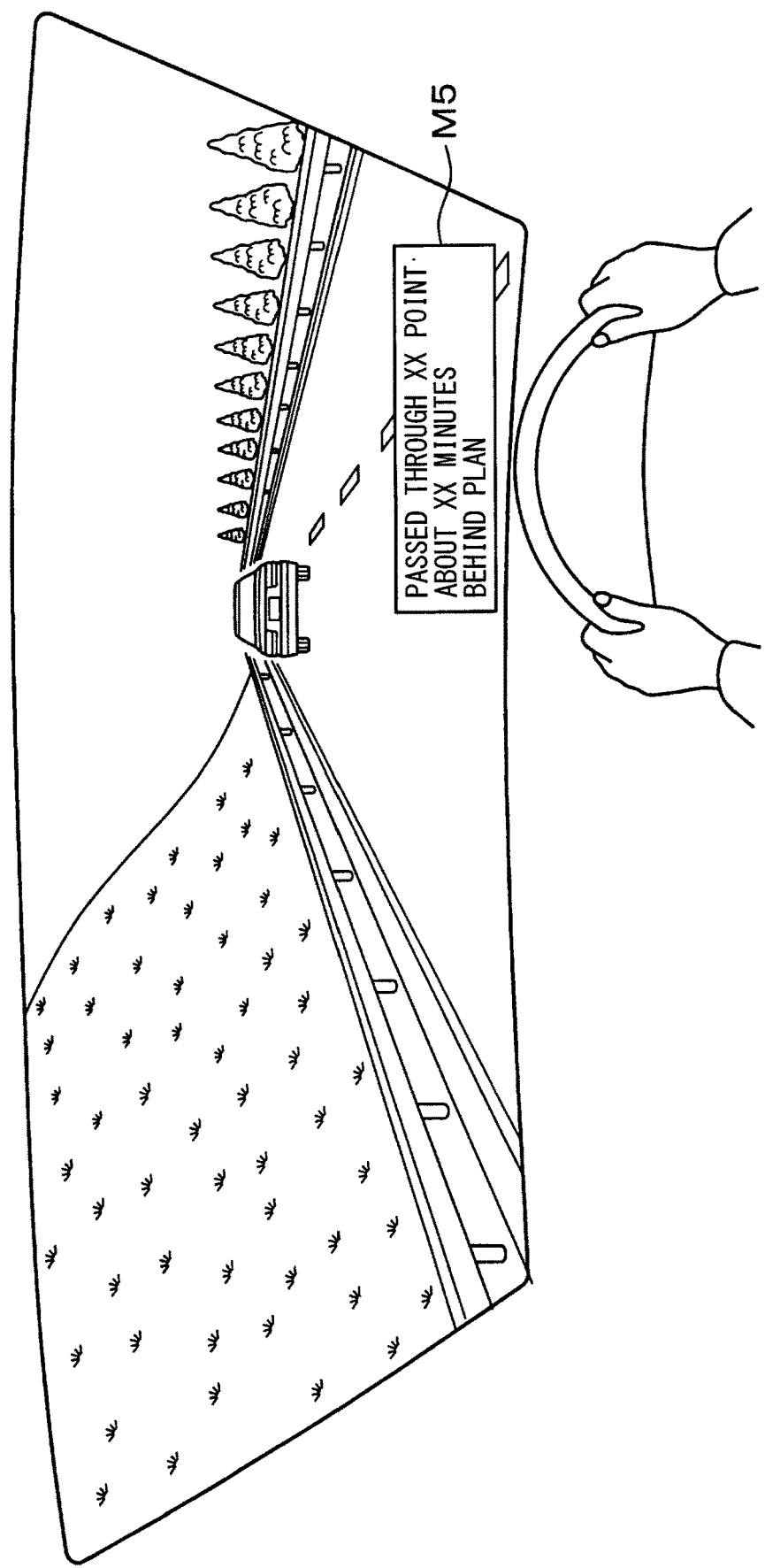
FIG. 7 is a diagram (No. 5) illustrating a notifying mode.

When the control unit 7 determines that the own vehicle passes through or has passed through the predetermined point after the predetermined time and thereby determines that autonomous driving is being performed behind the traveling plan, the control unit 7 displays, for example, display information M4 such as "passed through XX point behind plan" on the head-up display as illustrated in FIG. 6. The control unit 7 may calculate a delay time with respect to the traveling plan to display, for example, display information M5 such as "passed through XX point about XX minutes behind plan" on the head-up display as illustrated in FIG. 7. Also in this case, the control unit 7 may output a voice output command signal to the HMI device 6 through the navigation device 2 to voice-output voice information indicating that autonomous driving is being performed behind the traveling plan from the speaker.

When the control unit 7 determines that the autonomous driving end condition is not satisfied (S3: NO), the control unit 7 returns to step S2 described above and repeatedly performs step S2 and the following steps. On the other hand, when the control unit 7 determines that, for example, the own vehicle has passed through a switching determination point which is preciously set (the point before an exit interchange which is closest to the destination) and the autonomous driving end condition is thus satisfied (S3: YES), the control unit 7 finishes the autonomous driving state notifying process. That is, the control unit 7 determines whether autonomous driving is being performed according to the traveling plan at every determination timing during a period until the autonomous driving end condition is satisfied.

Figure 8:
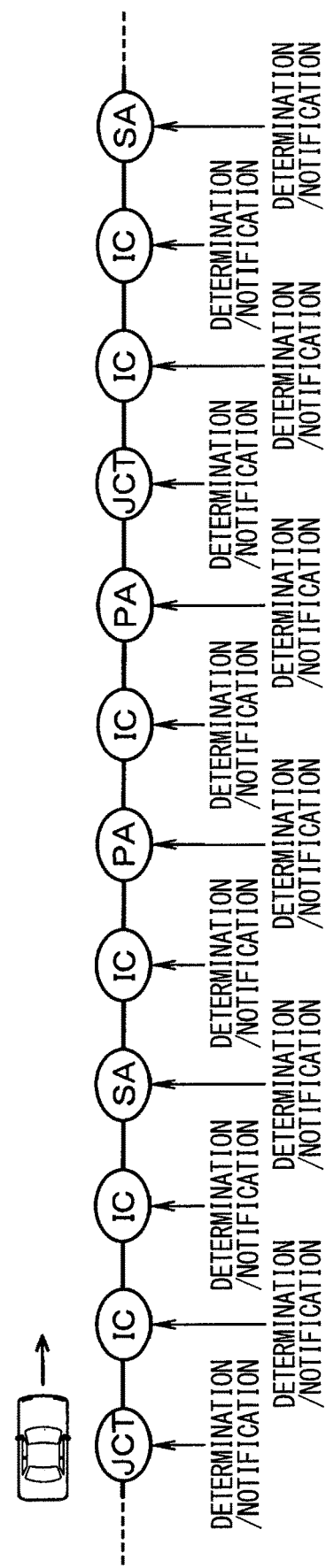
FIG. 8 is a diagram (No. 1) illustrating determination timing and notifying timing.

For example, when timing when the own vehicle passes through an interchange (IC), a junction (JCT), a service area (SA), and a parking area (PA) on an expressway is set as the determination timing, the control unit 7 determines whether autonomous driving is being performed according to the traveling plan at the timing when the own vehicle passes through the interchange or the like and notifies a result of the determination to the driver as illustrated in FIG. 8 by performing the process described above. That is, it is possible to notify whether autonomous driving is being performed according to the traveling plan to the driver at the timing when the own vehicle passes through a break point such as an interchange.

Figure 9:
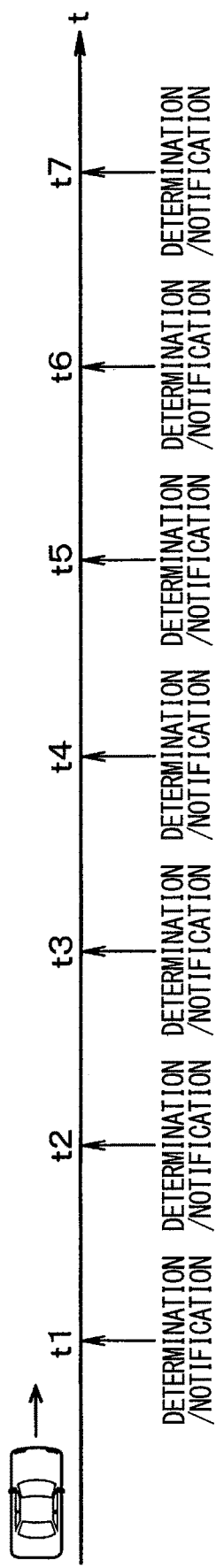
FIG. 9 is a diagram (No. 2) illustrating determination timing and notifying timing.
Figure 10:
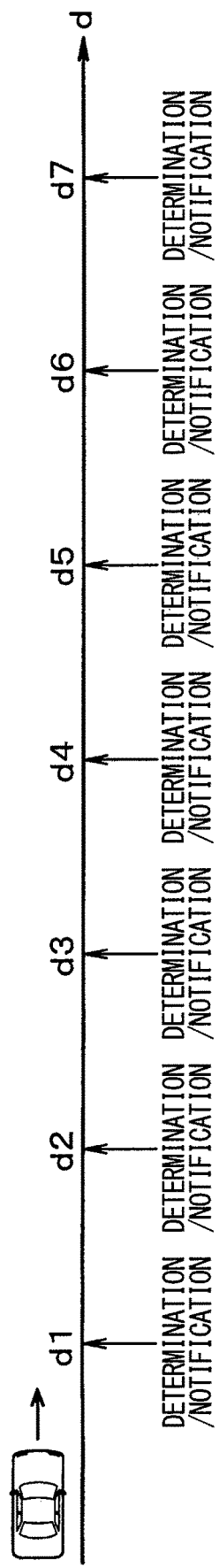
FIG. 10 is a diagram (No. 3) illustrating determination timing and notifying timing.

The control unit 7 may set the determination timing in any manner. The control unit 7 may make a determination at the timing when an elapsed time from the start of autonomous driving reaches a predetermined time (e.g., every 30 minutes, t1 to t7) and notify a result of the determination to the driver as illustrated in FIG. 9 regardless of whether the own vehicle passes through an interchange or the like. As illustrated in FIG. 10, the control unit 7 may make a determination at the timing when a travel distance of the own vehicle from the start of autonomous driving reaches a predetermined distance (e.g., every 10 kilometers, d1 to d7) and notify a result of the determination to the driver. The control unit 7 may combine these determination timings. That is, the control unit 7 may make a determination, for example, at the timing when the own vehicle passes through an interchange or the like or at the timing when the elapsed time from the start of autonomous driving reaches the predetermined time. The predetermined time and the predetermined distance may have fixed values or variable values settable by the driver in any manner.

Figure 11:
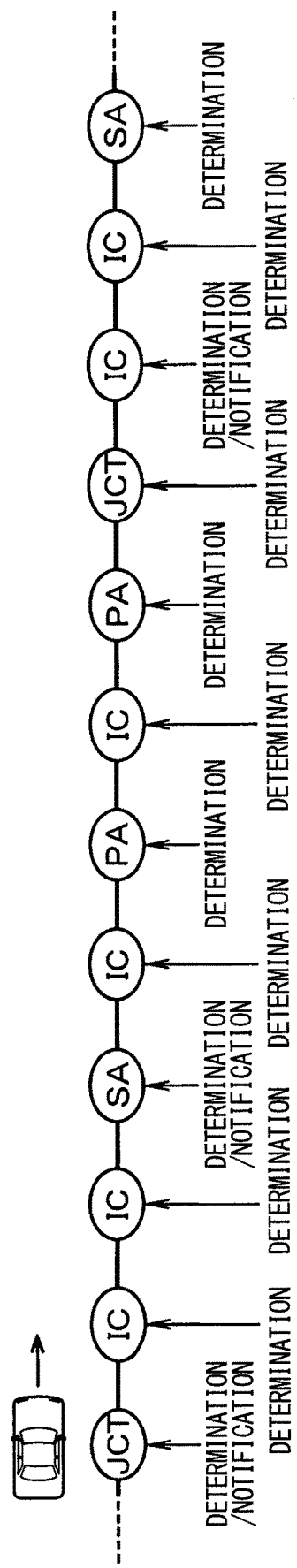
FIG. 11 is a diagram (No. 4) illustrating determination timing and notifying timing.
Figure 12:
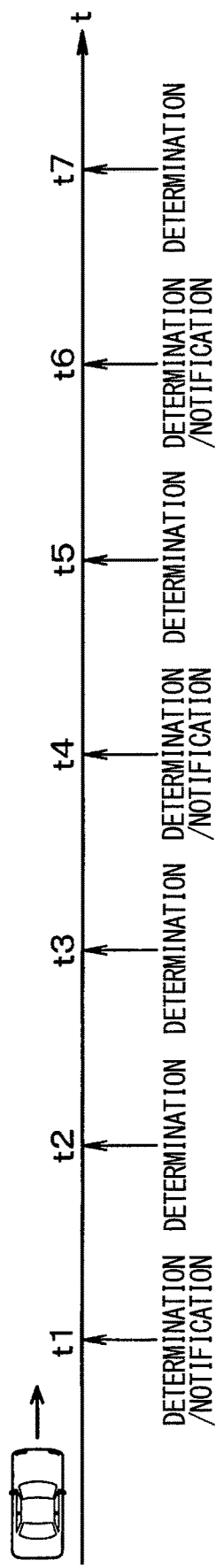
FIG. 12 is a diagram (No. 5) illustrating determination timing and notifying timing.
Figure 13:
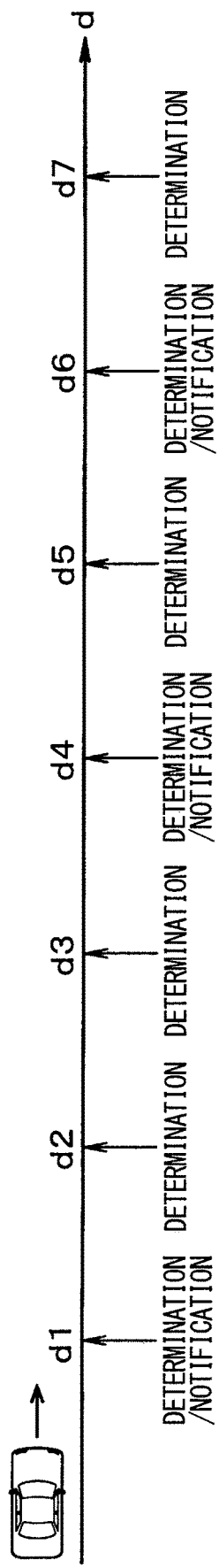
FIG. 13 is a diagram (No. 6) illustrating determination timing and notifying timing.

The control unit 7 may change the frequency of notifying a determination result according to the determination result whether autonomous driving is being performed according to the traveling plan. That is, as illustrated in FIG. 11, when the control unit 7 makes a determination at the timing when the own vehicle passes through an interchange or the like, the control unit 7 may not notify a determination result on every determination, but may thin out the timing of notifying a determination result. In this case, for example, when a determination result at the present determination timing is the same as a determination result at the previous determination timing, the control unit 7 may thin out the timing of notifying a determination result by not notifying the determination result at the present determination timing. Repetitive notification of the same determination result may annoy the driver. Thus, it is possible to prevent the driver from getting annoyed by thinning out the same determination result. As illustrated in FIG. 12, also when the control unit 7 makes a determination at the timing when the elapsed time from the start of autonomous driving reaches the predetermined time, the control unit 7 may thin out the timing of notifying a determination result in a similar manner. As illustrated in FIG. 13, also when the control unit 7 makes a determination at the timing when the travel distance of the own vehicle from the start of autonomous driving reaches the predetermined distance, the control unit 7 may thin out the timing of notifying a determination result in a similar manner.

The control unit 7 may change the frequency of notifying a determination result whether autonomous driving is being performed according to the traveling plan according to a time zone in which autonomous driving is performed, a traveling position of the own vehicle performing autonomous driving, or the number of times of autonomous driving performed in a predetermined period. For example, when a section in which autonomous driving is performed frequently exists in the same time zone, there is a possibility that the driver customarily grasps whether autonomous driving is performed according to a traveling plan. In this case, when the frequency of notifying a determination result is relatively high, the driver may get annoyed. However, the control unit 7 is capable of preventing the driver from getting annoyed by making the frequency of notifying a determination result relatively low.

As described above, according to the present embodiment, the following effects can be obtained.

In the autonomous driving system 1, an actual traveling state by autonomous driving is checked against a traveling plan of autonomous driving to determine whether autonomous driving is being performed according to the traveling plan, and a result of the determination is notified. Accordingly, it is possible to notify whether the autonomous driving system 1 is performing autonomous driving according to the traveling plan to the driver to give the driver a sense of security.

In the autonomous driving system 1, the correspondence relationship between a predetermined time based on a predetermined time instant and a predetermined point is created as the traveling plan of autonomous driving. It is determined that autonomous driving is being performed according to the traveling plan when it is determined that the own vehicle passes through or has passed through the predetermined point within the predetermined time, and it is determined that autonomous driving is not being performed according to the traveling plan when it is determined that the own vehicle does not pass through or has not passed through the predetermined point within the predetermined time. Accordingly, it is possible to determine whether autonomous driving is being performed according to the traveling plan on a time axis.

In the autonomous driving system 1, when it is determined that autonomous driving is not being performed according to the traveling plan, the difference between the traveling plan of autonomous driving and the actual traveling state by autonomous driving is calculated, and a result of the calculation is notified. Accordingly, it is possible to notify how much autonomous driving is ahead of or behind the traveling plan to the driver.

In the autonomous driving system 1, the traveling plan is created using not only navigation information, but also, for example, traffic information by the VICS, and the traveling plan is successively updated in response to later changes in the traffic situation. Accordingly, it is possible to flexibly adapt to changes in the traffic situation.

In the autonomous driving system 1, it is determined whether autonomous driving is being performed according to the traveling plan at the timing when the own vehicle passes through or has passed through the predetermined point, the timing when an elapsed time from the start of autonomous driving reaches a predetermined time, and the timing when a travel distance of the own vehicle from the start of autonomous driving reaches a predetermined distance. Accordingly, it is possible to periodically determine whether autonomous driving is being performed according to the traveling plan at the timing based on the predetermined point, the elapsed time from the start of autonomous driving, and the travel distance of the own vehicle from the start of autonomous driving.

In the autonomous driving system 1, the frequency of notifying a determination result whether autonomous driving is being performed according to the traveling plan is changed according to the determination result whether autonomous driving is being performed according to the traveling plan, a time zone in which autonomous driving is performed, a traveling position of the own vehicle performing autonomous driving, and the number of times of autonomous driving performed in a predetermined period. Accordingly, it is possible to prevent the driver from getting annoyed by the notification of the determination result.

The present disclosure may be applied not only to the case where a section between interchanges on a main line of an expressway is defined as the autonomous driving section, but also the case where another section is defined as the autonomous driving section.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An autonomous driving system comprising:
a traveling plan creation section that creates a traveling plan of an autonomous driving operation, the traveling plan creation section creates a correspondence relationship between a predetermined time based on a predetermined clock time and a predetermined point as the traveling plan of the autonomous driving operation;
a traveling state acquisition section that acquires an actual traveling state in the autonomous driving operation;
a determination section that verifies the actual traveling state in the autonomous driving operation with the traveling plan of the autonomous driving operation, and determines whether the autonomous driving operation is performed according to the traveling plan, the determination section determines that the autonomous driving operation is:
performed according to the traveling plan in response to the determination section determining that a vehicle passes through or has passed through the predetermined point within the predetermined time; and
not performed according to the traveling plan in response to the determination section determining that the vehicle does not pass through or has not passed through the predetermined point within the predetermined time; and
a notification control section that notifies a determination result of the determination section, wherein:
the notification control section changes a frequency of repeated notifying of the determination result of the determination section by not notifying the determination result at a present determination time point to reduce a numerical number of times of notification of the determination result in response to the determination result at the present determination time point being the same as the determination result at a previous determination time point.

2. The autonomous driving system according to claim 1, wherein:
the determination section calculates a difference between the traveling plan of the autonomous driving operation and the actual traveling state in the autonomous driving operation in response to when the determination section determining determines that autonomous driving is not performed according to the traveling plan.

3. The autonomous driving system according to claim 1, wherein:
the traveling plan creation section updates the traveling plan of the autonomous driving operation while the autonomous driving operation is performed.

4. The autonomous driving system according to claim 1, wherein:
the determination section determines, whether the autonomous driving operation is performed according to the traveling plan, at least one of a time point when the vehicle passes through or has passed through the predetermined point, a time point when an elapsed time from start of the autonomous driving operation reaches a predetermined time, and a time point when a travel distance of the vehicle from the start of the autonomous driving operation reaches a predetermined distance.

5. The autonomous driving system according to claim 1, wherein:
the notification control section changes a frequency of notifying the determination result of the determination section according to at least one of the determination result of the determination section, a time zone in which the autonomous driving operation is performed, a traveling place of a vehicle performing the autonomous driving operation, and a numerical number of times of the autonomous driving operation performed in a predetermined period.

6. The autonomous driving system according to claim 1, wherein:
the determination section determines, whether the autonomous driving operation is performed according to the traveling plan at, at least one of:
a time point when the vehicle passes through or has passed through the predetermined point, and
a time point when a travel distance of the vehicle from the start of the autonomous driving operation reaches a predetermined distance.

7. The autonomous driving system according to claim 1, wherein:
the notification control section changes the frequency of repeated notifying of the determination result by thinning out the frequency of repeated notifying of the determination result.

8. The autonomous driving system according to claim 7, wherein:
the notification control section thins out the frequency of repeated notifying of the determination result by not notifying the determination result at a certain determination timing.

9. A non-transitory tangible computer readable medium comprising: instructions being executed by a computer, the instructions including a computer-implemented method for an autonomous driving state notifying method that controls a control unit in an autonomous driving system to execute:
a traveling plan creation step of creating a traveling plan of an autonomous driving operation, and creating a correspondence relationship between a predetermined time based on a predetermined clock time and a predetermined point as the traveling plan of the autonomous driving operation;
a traveling state acquisition step of acquiring an actual traveling state in the autonomous driving operation;
a determination step of verifying the actual traveling state in the autonomous driving operation with the traveling plan of the autonomous driving operation, and determining whether the autonomous driving operation is performed according to the traveling plan, the determination step determines that the autonomous driving operation is:
performed according to the traveling plan in response to the determination step determining that a vehicle passes through or has passed through the predetermined point within the predetermined time; and
not performed according to the traveling plan in response to the determination step determining that the vehicle does not pass through or has not passed through the predetermined point within the predetermined time; and a notification control step of notifying a determination result of the determination step, wherein:

the notification control step further includes changing a frequency of repeated notifying of the determination result by not notifying the determination result at a present determination time point to reduce a numerical number of times of notification of the determination result in response to the determination result at the present determination time point being the same as the determination result at a previous determination time point.

10. The non-transitory tangible computer readable medium according to claim 9, wherein:

the determination step determines, whether the autonomous driving operation is performed according to the traveling plan at, at least one of:

a time point when a vehicle passes through or has passed through a predetermined point, and a time point when a travel distance of the vehicle from the start of the autonomous driving operation reaches a predetermined distance.

11. The non-transitory tangible computer readable medium according to claim 9, wherein:

the notification control step changes the frequency of repeated notifying of the determination result by thinning out the frequency of repeated notifying of the determination result.

12. The non-transitory tangible computer readable medium according to claim 11, wherein:

the notification control step thins out the frequency of repeated notifying of the determination result by not notifying the determination result at a certain determination timing.

13. An autonomous driving state notifying method comprising:

creating a traveling plan of an autonomous driving operation, and creating a correspondence relationship between a predetermined time based on a predetermined clock time and a predetermined point as the traveling plan of the autonomous driving operation;

acquiring an actual traveling state in the autonomous driving operation;

verifying the actual traveling state in the autonomous driving operation with the traveling plan of the autonomous driving operation, and determining whether the autonomous driving operation is performed according to the traveling plan, the autonomous driving operation being determined to be:

performed according to the traveling plan in response to determining that a vehicle passes through or has passed through the predetermined point within the predetermined time; and not performed according to the traveling plan in response to determining that the vehicle does not pass through or has not passed through the predetermined point within the predetermined time; and notifying a determination result of the determining, wherein:

the notifying of the determination result further includes changing a frequency of repeated notifying of the determination result by not notifying the determination result at a present determination time point to reduce a numerical number of times of notification of the determination result in response to the determination result at the present determination time point being the same as the determination result at a previous determination time point.

14. The autonomous driving state notifying method according to claim 13, wherein:

determining whether the autonomous driving operation is performed according to the traveling plan includes determining at least one of:

a time point when a vehicle passes through or has passed through a predetermined point, and a time point when a travel distance of the vehicle from the start of the autonomous driving operation reaches a predetermined distance.

15. The autonomous driving state notifying method according to claim 13, wherein:

the frequency of repeated notifying of the determination result is changed by thinning out the frequency of repeated notifying of the determination result.

16. The autonomous driving state notifying method according to claim 15, wherein:

the frequency of repeated notifying of the determination result is thinned out by not notifying the determination result at a certain determination timing.

* * * * *